United States Patent
Patterson et al.

(10) Patent No.: US 9,950,645 B2
(45) Date of Patent: Apr. 24, 2018

(54) LOW PROFILE CONSTANT FORCE LINEARLY ACTUATED BRAKE ASSEMBLY FOR AIRCRAFT SEATING

(71) Applicant: AMI Industries Inc., Colorado Springs, CO (US)

(72) Inventors: Scott R. Patterson, Manitou Springs, CO (US); Keith M. Ferguson, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 57 days.

(21) Appl. No.: 15/076,398

(22) Filed: Mar. 21, 2016

(65) Prior Publication Data

US 2017/0267127 A1    Sep. 21, 2017

(51) Int. Cl.
*B60N 2/14* (2006.01)
*B64D 11/06* (2006.01)

(52) U.S. Cl.
CPC ............ *B60N 2/146* (2013.01); *B64D 11/064* (2014.12); *B64D 11/0639* (2014.12)

(58) Field of Classification Search
CPC ........ B60N 2/146; B60N 2/08; B60N 2/0831; B60N 2/0837; B60N 2/0843; B60N 2/085; B60N 2/0856; B60N 2/0881; B60N 2/0887; B60N 2/442; B60N 2/443; B60N 2/4435; B60N 2/444; B60N 2002/4425
USPC ............ 188/31, 109, 382; 74/539, 542, 560, 74/594.4; 297/344.22, 344.24, 344.1
See application file for complete search history.

(56) References Cited

U.S. PATENT DOCUMENTS

| | | | | |
|---|---|---|---|---|
| 3,622,202 A | * | 11/1971 | Brown | A47C 1/02 248/429 |
| 5,161,765 A | * | 11/1992 | Wilson | B60N 2/062 248/425 |
| 5,568,960 A | | 10/1996 | Oleson | |
| 5,599,065 A | | 2/1997 | Gryp | |
| 7,108,325 B2 | * | 9/2006 | Williamson | A47C 3/18 297/344.22 |
| 7,775,595 B2 | * | 8/2010 | McMillen | B60N 2/0232 248/424 |
| 8,100,232 B2 | * | 1/2012 | Forster | B60T 13/741 188/72.7 |
| 8,109,577 B2 | * | 2/2012 | Shao | B60N 2/01541 297/463.2 |

(Continued)

FOREIGN PATENT DOCUMENTS

EP    2460684    6/2012
WO    2006041570    4/2006

OTHER PUBLICATIONS

EP Search Report dated Sep. 19, 2017 in EP Application No. 17161817.6.

*Primary Examiner* — Thomas W Irvin
(74) *Attorney, Agent, or Firm* — Snell & Wilmer L.L.P.

(57) ABSTRACT

The present disclosure provides a brake assembly for aircraft cabin fixtures. A brake assembly includes a carriage, a lever having a ramp, a shaft, and a pivot, wherein the lever is coupled to the pivot, wherein the shaft is coupled to the lever, and wherein the carriage is configured to ride along the ramp. A brake assembly may comprise a spring in communication with the lever. The shaft may comprise a first end and a brake plate coupled at the first end. The ramp may comprise a slot. A brake assembly may comprise an actuation lever coupled to the carriage.

19 Claims, 11 Drawing Sheets

(56) References Cited

U.S. PATENT DOCUMENTS

| | | | | |
|---|---|---|---|---|
| 8,931,847 B2* | 1/2015 | Cailleteau | ............ | B60N 2/0224 297/411.3 |
| 2009/0114793 A1* | 5/2009 | Brewer | ................ | B60N 2/0705 248/429 |
| 2009/0127908 A1 | 5/2009 | Kucharski | | |

* cited by examiner

US 9,950,645 B2

LOW PROFILE CONSTANT FORCE LINEARLY ACTUATED BRAKE ASSEMBLY FOR AIRCRAFT SEATING

FIELD

The present disclosure relates devices for vehicle interior fixtures. More specifically, the disclosure described relates to improved brake mechanisms for aircraft cabin seats.

BACKGROUND

Executive aircraft cabin seats tend to have a degree of swivel or rotation. Occupants often desire to arrest seat rotation or lock the seat in a particular direction. Conventional seat brake mechanisms tend to be heavy and make poor use of the limited space within a seat.

SUMMARY

In various embodiments, the present disclosure provides a brake assembly comprising a carriage; a lever having a ramp, a shaft, and a pivot, wherein the lever is mounted to the pivot, wherein the shaft is coupled to the lever, and wherein the carriage is configured to ride along the ramp and constrained to move in a plane substantially perpendicular to the shaft.

In various embodiments, the brake assembly comprises a spring in communication with the lever. In various embodiments, the shaft comprises a first end and a brake plate coupled at the first end. In various embodiments, the ramp comprises a slot. In various embodiments, the brake assembly comprises an actuation lever coupled to the carriage. In various embodiments, the coupling between the actuation lever and the carriage comprises a cable. In various embodiments, a portion of the shaft is threaded. In various embodiments, the carriage comprises a wheel. In various embodiments, the wheel is disposed in a channel. In various embodiments, the brake assembly comprises at least one of steel, stainless steel, aluminum, aluminum alloy, titanium, titanium alloy, composite, or polymeric material.

In various embodiments, the present disclosure provides a cabin fixture comprising a seat pan, a pedestal, and a brake assembly, wherein the brake assembly comprises a carriage, a lever having a ramp, a shaft, and a pivot, wherein the lever is mounted to the pivot, wherein the shaft is coupled to the lever, wherein the carriage is configured to ride along the ramp and constrained to move in a plane substantially perpendicular to the shaft, wherein the seat pan is coupled to the brake assembly, wherein a portion of the shaft is disposed within the pedestal.

In various embodiments, the cabin fixture comprises a brake plate, wherein the pedestal comprises a friction surface, wherein the shaft comprises a first end, wherein the brake plate is coupled to the first end, and wherein an interference between the friction surface and the brake plate tends to limit rotation of the seat pan with respect to the pedestal. In various embodiments, the ramp comprises a slot. In various embodiments, the portion of the shaft is threaded. In various embodiments, the cabin fixture comprises at least one of steel, stainless steel, aluminum, aluminum alloy, titanium, titanium alloy, composite, or polymeric material.

In various embodiments, the present disclosure provides a method of operating a brake assembly comprising applying a motive force to a carriage, translating the carriage along a ramp from a locked state to an unlocked state in response to the motive force, moving a lever from the locked state to the unlocked state in response to the translation of the carriage along the ramp, and extending a shaft in response to the movement of the lever from the locked state to the unlocked state. The method may further comprise compressing a spring and generating a spring force in response to the movement of the lever from the locked state to the unlocked state while the motive force is applied. The method may further comprise varying the motive force with respect to the spring force in response to the translation of the carriage along the ramp from the locked state to the unlocked state, wherein the variation is approximately linear with respect to the translation of the carriage. The method may further comprise removing the motive force from the carriage and applying the spring force to the lever, moving the lever from the unlocked state to the locked state in response to the application of the spring force and translating the carriage along the ramp from the unlocked state to the locked state in response to the application of the spring force. The method may further comprise retracting the shaft in response to the translation of the carriage along the ramp from the unlocked state to the locked state and the movement of the lever from the unlocked state to the locked state.

Figure 1:
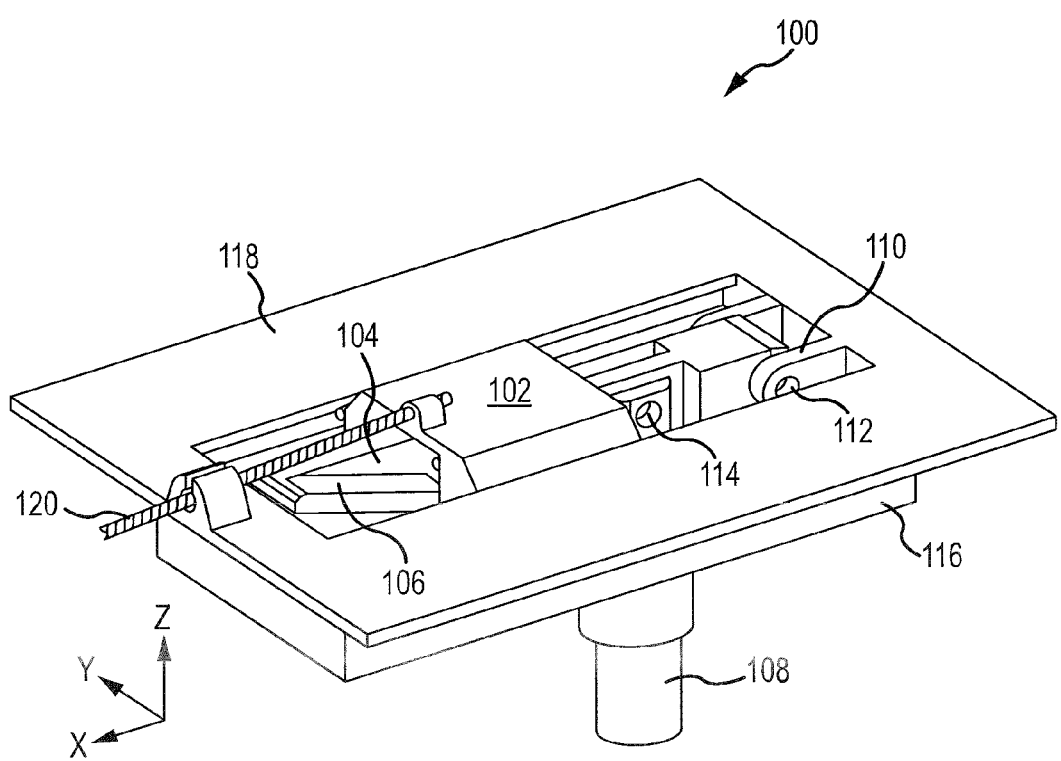
FIG. 1 illustrates a brake assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Further more, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

All ranges and ratio limits disclosed herein may be combined. It is to be understood that unless specifically stated otherwise, references to "a," "an," and/or "the" may include one or more than one and that reference to an item in the singular may also include the item in the plural.

In various embodiments, a brake assembly for aircraft cabin fixtures is disclosed. A brake assembly may comprise a carriage, a lever having a ramp, a shaft, and a pivot. The carriage is configured to ride along the ramp and may be coupled to an actuation lever by a cable. In response to a motive force, the carriage may translate along the ramp from a locked state to an unlocked state, tending to cause the lever to rotate about the pivot. Stated another way, the lever may move from the locked state to the unlocked state in response to the translation of the carriage. In various embodiments, the carriage may be constrained to move in a plane substantially perpendicular to the shaft where, in this context, substantially means between +15 degrees and −15 degrees. The shaft may be coupled to the lever and may extend in response to the movement of the lever from the locked to the unlocked state. The brake assembly may comprise a brake plate coupled at a first end of the shaft. A spring may be disposed about the shaft which is compressed in response to the movement of the lever and the extension of the shaft, tending to generate a spring force. The spring force acts upon the lever tending to return the lever from the unlocked state to the locked state, thereby retracting the shaft and translating the carriage along the ramp from the unlocked state to the locked state.

In various embodiments, a cabin fixture is disclosed and may comprise a seat pan, a pedestal, and a brake assembly. The seat pan may be coupled to the brake assembly and may rotate with respect to the pedestal. The brake assembly may comprise a carriage, a lever having a ramp, a shaft, and a pivot. The lever may be coupled to the pivot, the shaft may be coupled to the lever, and the carriage may be configured to ride along the ramp. A portion of the shaft may be disposed within the pedestal. The pedestal may comprise a friction surface and the shaft may have a first end coupled to a brake plate beneath the pedestal proximate the friction surface. An interference between the friction surface and the brake plate tends to limit the rotation of the seat pan with respect to the pedestal. In response to a motive force, the carriage may translate along the ramp from a locked state to an unlocked state tending to cause the lever to rotate about the pivot. Stated another way, the lever moves from the locked state to the unlocked state in response to the translation of the carriage. In various embodiments, the carriage may be constrained to move in a plane substantially perpendicular to the shaft where, in this context, substantially means between +15 degrees and −15 degrees. The shaft coupled to the lever may extend in response to the movement of the lever from the locked to the unlocked state. Extension of the shaft in response to the movement of the lever tends to disrupt the interference between the friction surface and the brake plate, thereby tending to allow rotation of the seat pan with respect to the pedestal. A spring may be disposed about the shaft which is compressed in response to the movement of the lever and the extension of the shaft tending to generate a spring force. The spring force acts upon the lever tending to return the lever from the unlocked state to the locked state, thereby retracting the shaft and translating the carriage along the ramp from the unlocked state to the locked state. Retraction of the shaft tends to reestablish the interference between the friction surface and the brake plate.

With reference now to FIG. 1, in accordance with various embodiments, a brake assembly 100 comprises a carriage 102, a lever 104 having a ramp 106, a shaft 108, and a pivot 110. Lever 104 is mounted at pivot 110 by a pin 112 and shaft 108 is coupled to lever 104 by pin 114. Xyz axes are provided for ease of illustration. In that regard, a measurement point displaced in the positive z-axis direction from a given reference point may be considered "above" or on "top" of the given reference point. In contrast, a measurement point displaced in the negative z-axis direction from the given reference point may be considered "below" or on "bottom" of the given reference point. In that regard, the terms "top" and "bottom" or "above" and "below" may refer to relative positions along the z-axis. For example, the carriage 102 sits above the lever 104 and the shaft 108 extends below the lever 104. The carriage 102, the lever 104, the shaft 108, and the pivot 110 are disposed a housing 116. The housing 116 is closed at the top by a plate 118. The carriage 102 may be coupled to an actuation lever by a cable 120, which may impart a motive force to the carriage 102. The carriage 102 is restrained by the housing 116 and the plate 118 such that in response to the motive force imparted by the cable 120, the carriage 102 translates along the ramp 106 in the positive x-direction. The lever 104 responds to the motive force and the translation of the carriage 102 by rotating about the pivot 110 toward the bottom of the housing 116. In response to the movement of the lever 104 toward the bottom of the housing 116, shaft 108 tends to extend further below the housing 116.

In various embodiments, brake assembly 100 may comprise at least one of steel, stainless steel, aluminum, aluminum alloy, titanium, titanium alloy, composite, or a polymeric material. For example, housing 116 may comprise an aluminum alloy and plate 118 may comprise a composite.

Figure 2:
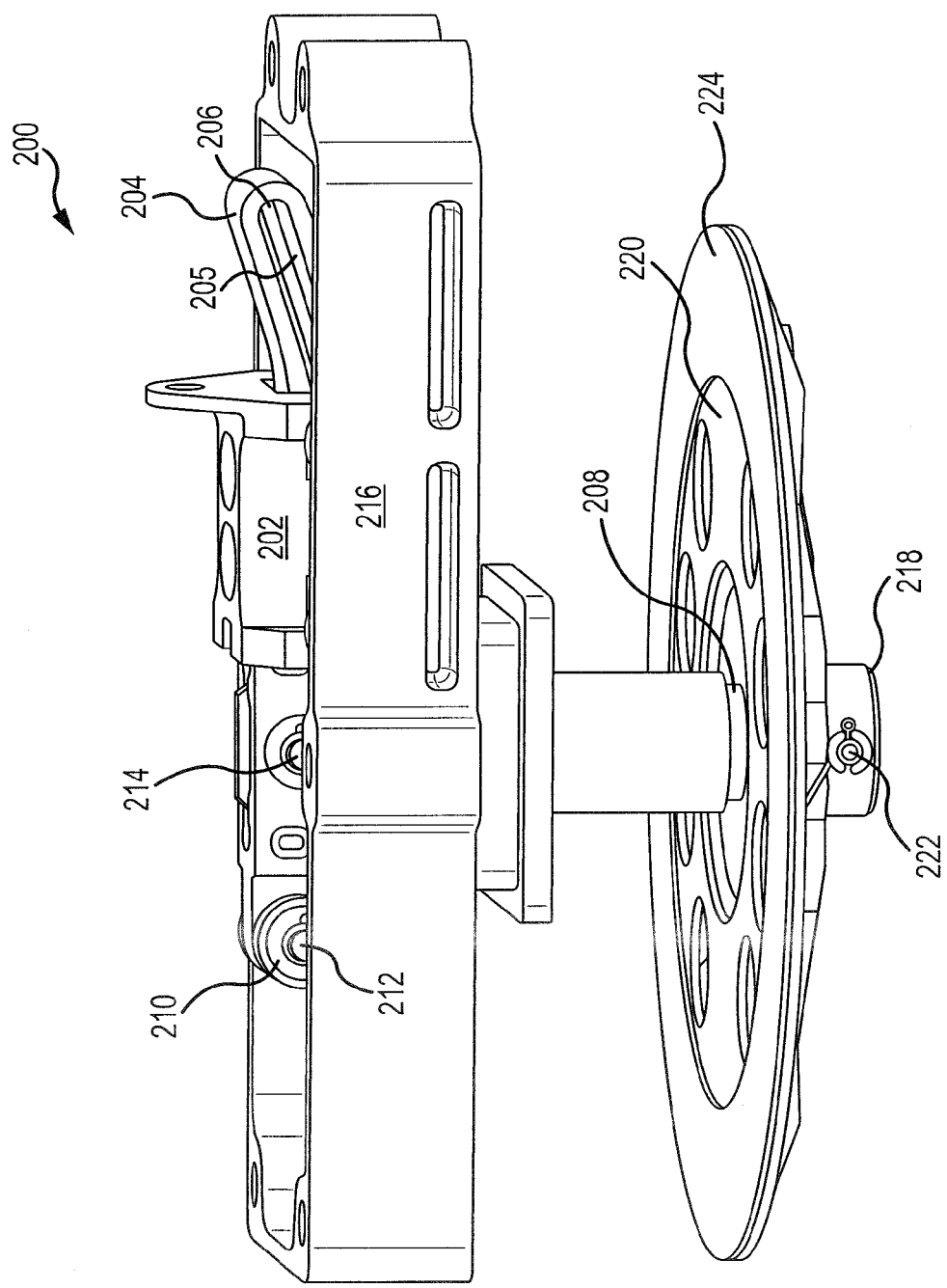
FIG. 2 illustrates a brake assembly with cover plate removed, in accordance with various embodiments.

In accordance with various embodiments and with reference now to FIG. 2, a brake assembly 200 is shown to comprise a carriage 202, a lever 204 having a ramp 205 comprising a slot 206, a shaft 208, and a pivot 210. Lever 204 is mounted to the pivot 210 by pin 212 and is coupled to the shaft 208 by pin 214. The carriage 202, the lever 204, the pivot 210, and the shaft 208 are disposed within a housing 216. The shaft 208 has a first end 218 which is coupled via pin 222 to a brake plate 220 having a friction surface 224.

Figure 3:
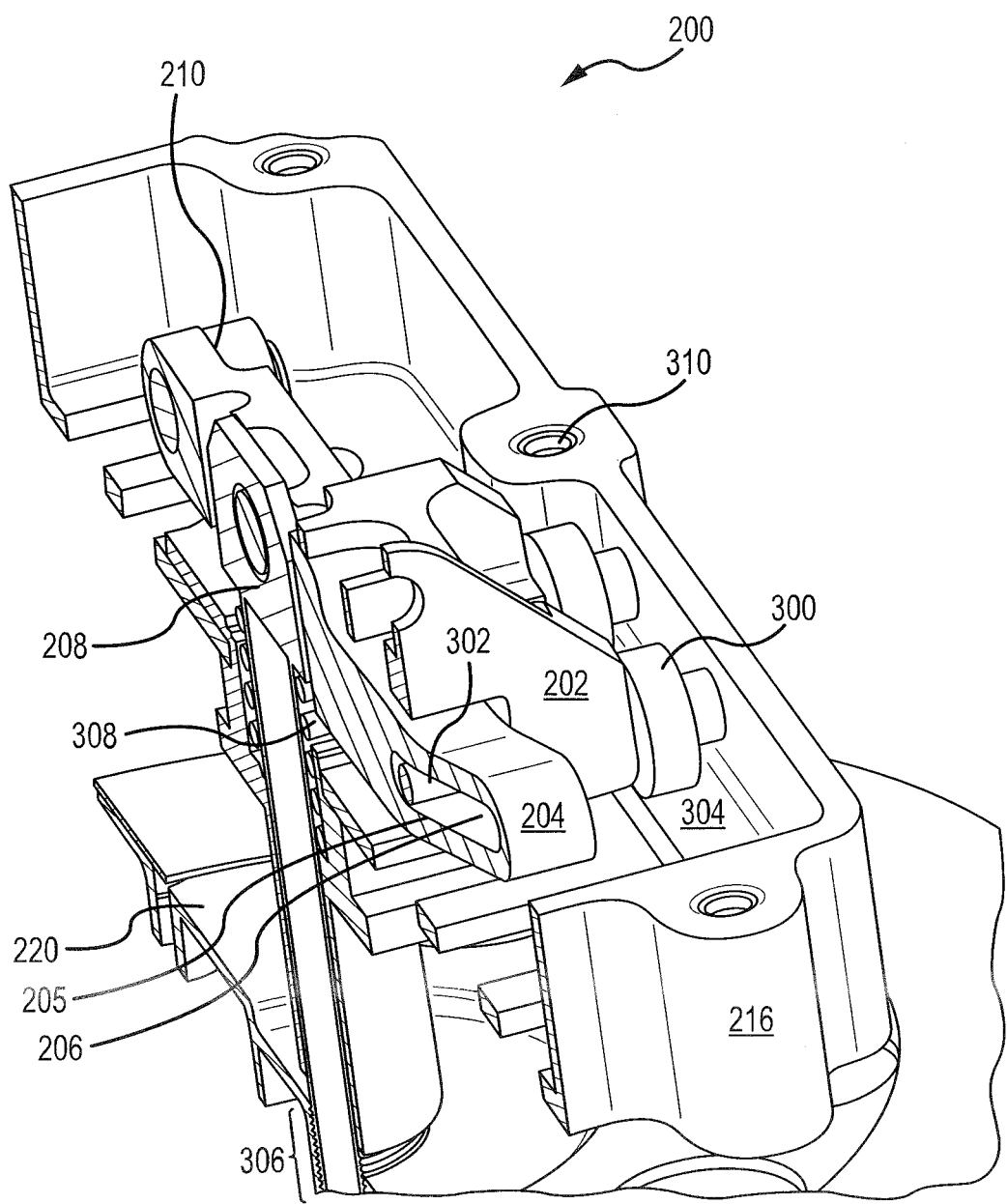
FIG. 3 illustrates a sectioned view of a brake assembly, in accordance with various embodiments.

In accordance with various embodiments and with reference now to FIG. 3, a sectioned view of a brake assembly 200 is shown to illustrate features interior of the housing 216. The carriage 202 comprises a wheel 300 coupled to an axle 302 disposed within slot 206 that rides against the ramp 205. The wheel 300 is disposed in a channel 304 which runs parallel to the x-axis. The wheel is retained in the channel by a closeout plate, such as plate 118 depicted in FIG. 1, which may be coupled at the top of the housing by fasteners at a thread hole 310. A spring 308 is disposed about shaft 208 and is in communication with the lever 204. The shaft 208 is coupled to the brake plate 220 by a threaded coupling 306. In various embodiments, a threaded coupling, such as threaded coupling 306, provides for adjustment of a brake plate along the z-axis between about 0.001 inches (0.00254 cm) to about 0.01 inches (0.0254 cm) for every 180 degree rotation of the brake plate, between about 0.0015 inches (0.00381 cm) to about 0.01 inches (0.0254 cm) for every 180 degree rotation of the brake plate, and between about 0.005 inches (0.0127 cm) to about 0.01 (0.0254 cm) inches for every 180 degree rotation of the brake plate, wherein the term about in this context only refers to +/−0.0001 inches (0.000254 cm).

Figure 4:
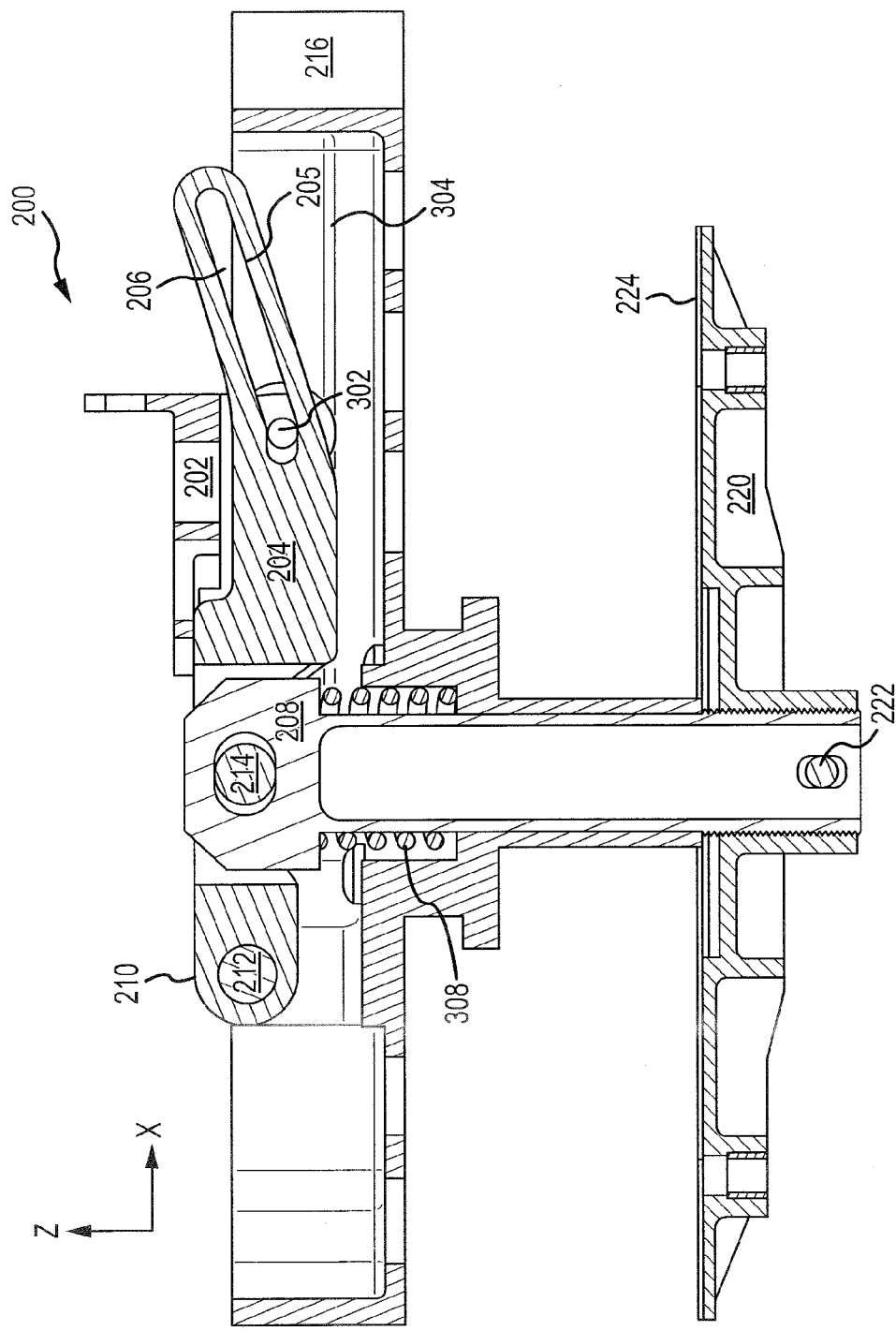
FIG. 4 illustrates a cross section of a brake assembly in the locked state, in accordance with various embodiments.

In various embodiments and with reference now to FIG. 4, a cross section of a brake assembly 200 is shown in the locked state. The carriage 202 is proximate the shaft 208 and the spring 308 tends to hold the brake plate 220 and the friction surface 224 proximate the housing 216. The axle 302 of the carriage 202 rests in the slot 206 at the bottom of the ramp 205.

Figure 5:
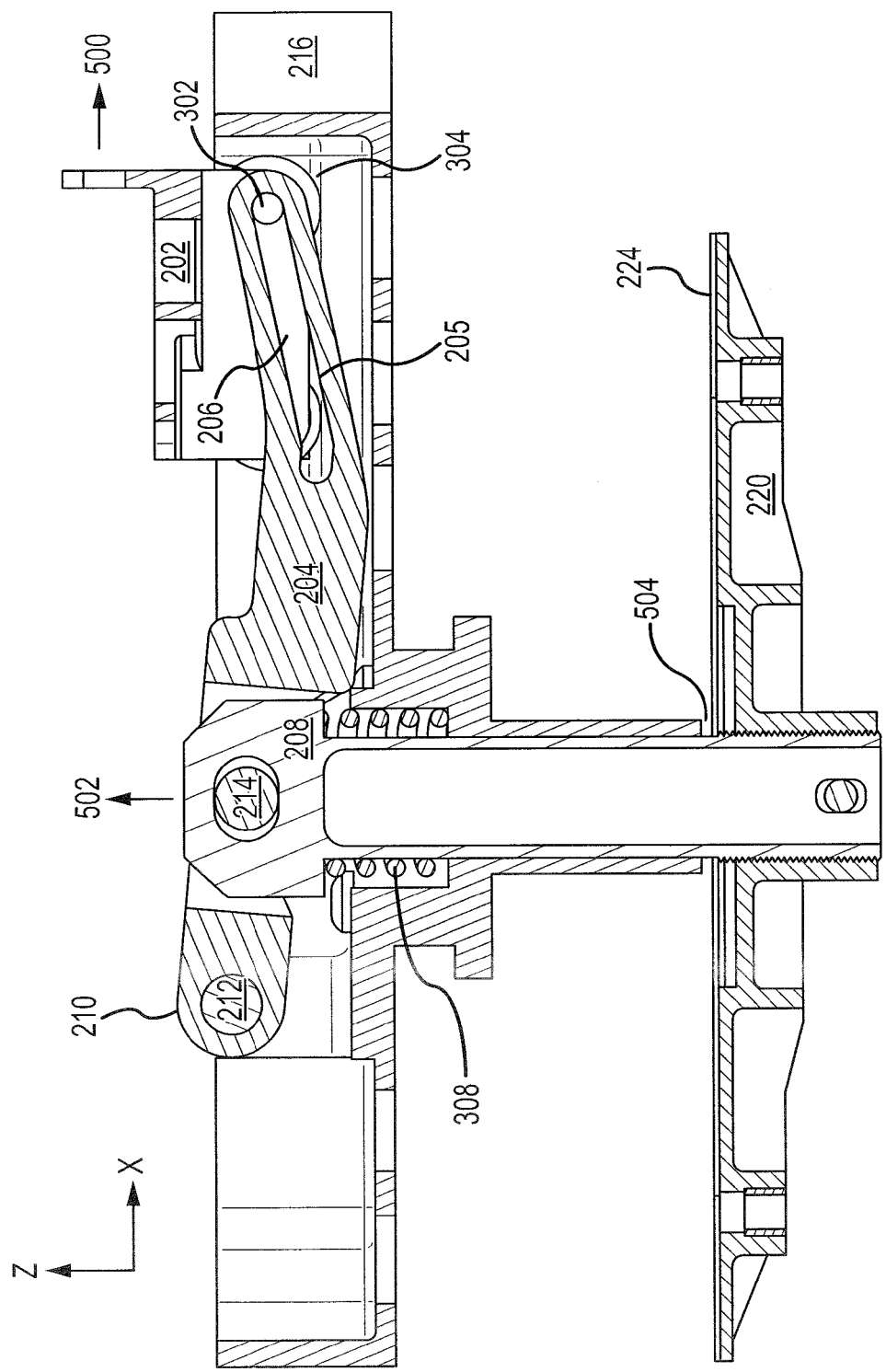
FIG. 5 illustrates a cross section of a brake assembly in the unlocked state, in accordance with various embodiments.
Figure 6A:
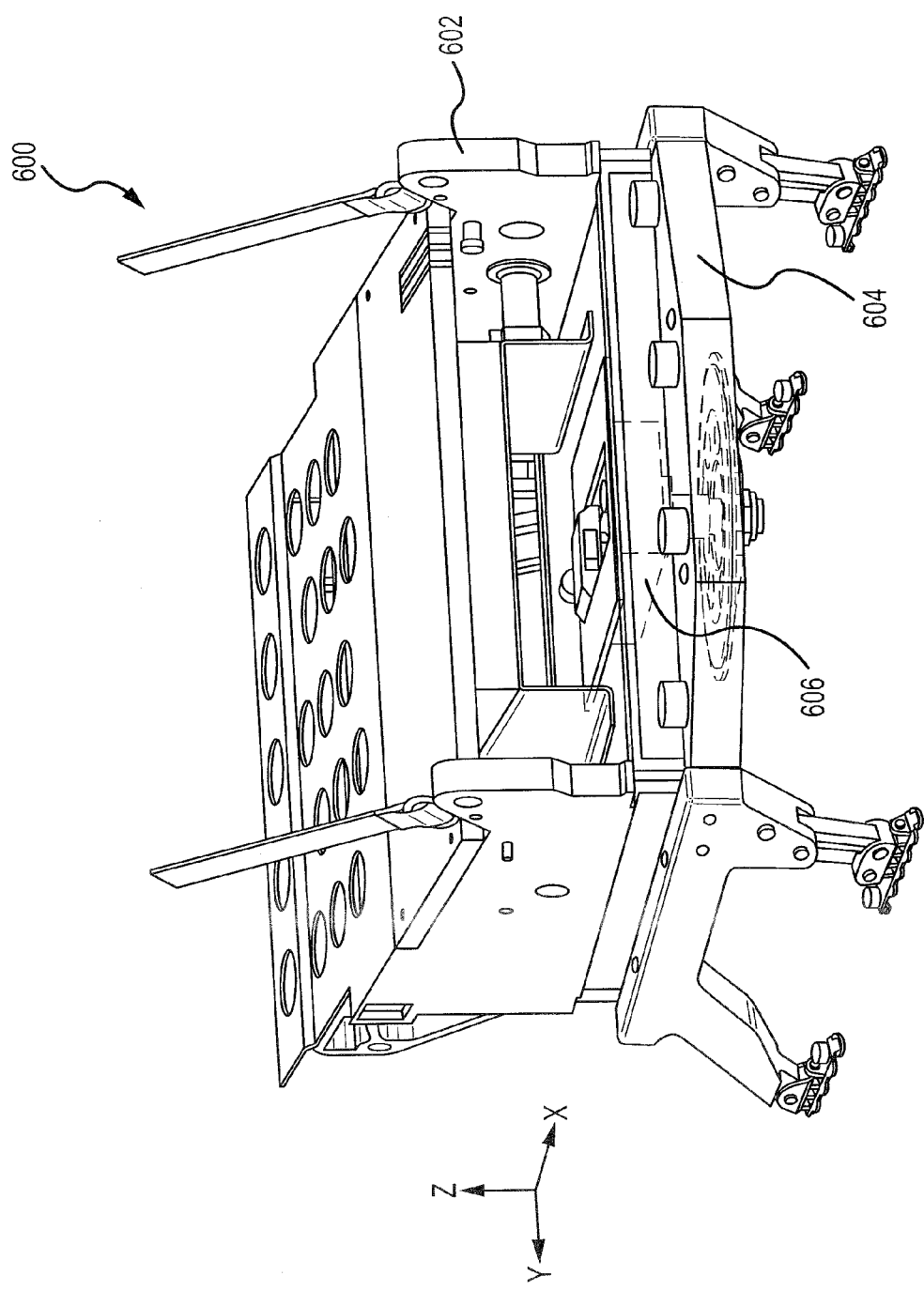
FIG. 6A illustrates a cabin fixture, in accordance with various embodiments.
Figure 6B:
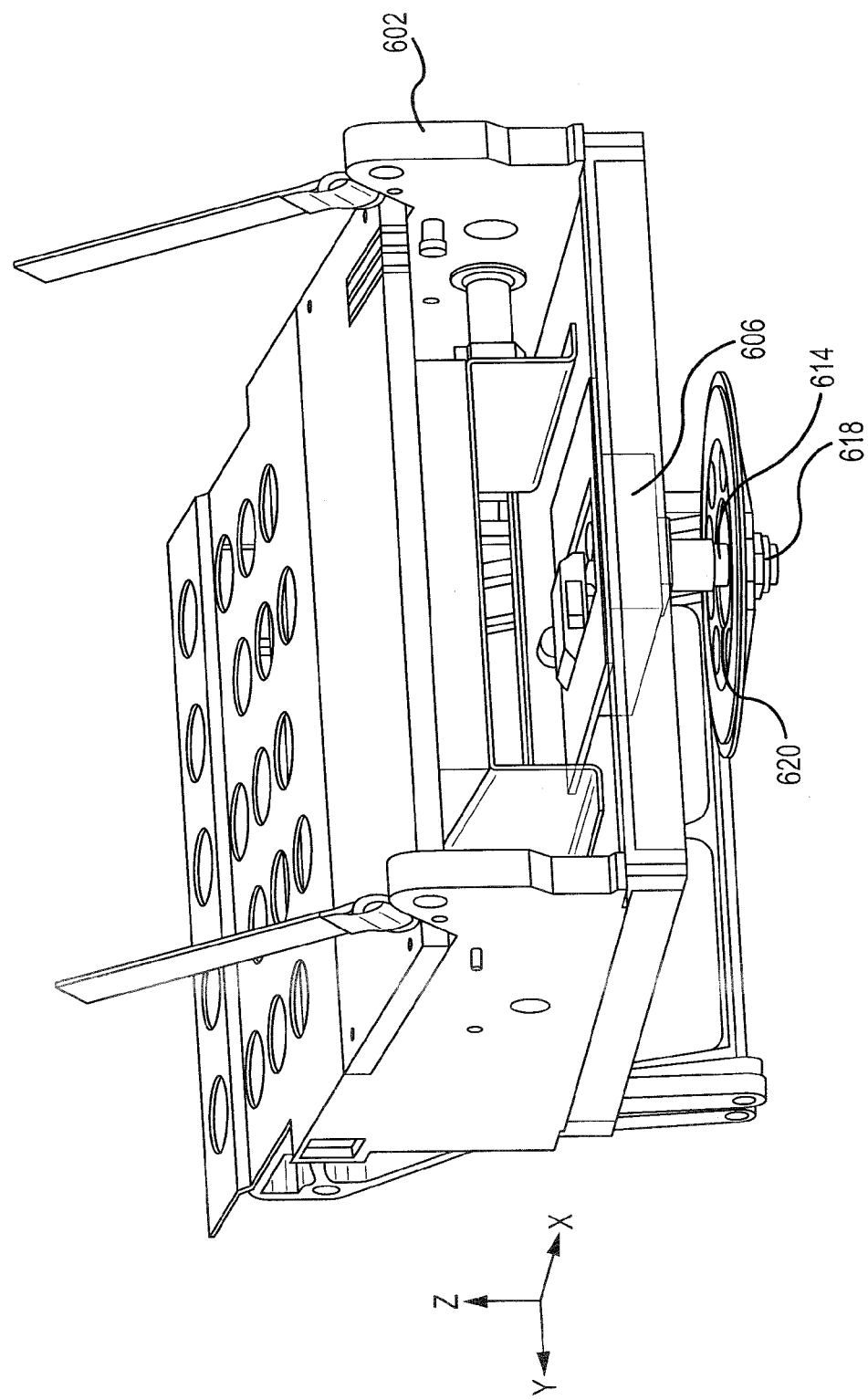
FIG. 6B illustrates a cabin fixture with the pedestal removed for clarity, in accordance with various embodiments.
Figure 6C:
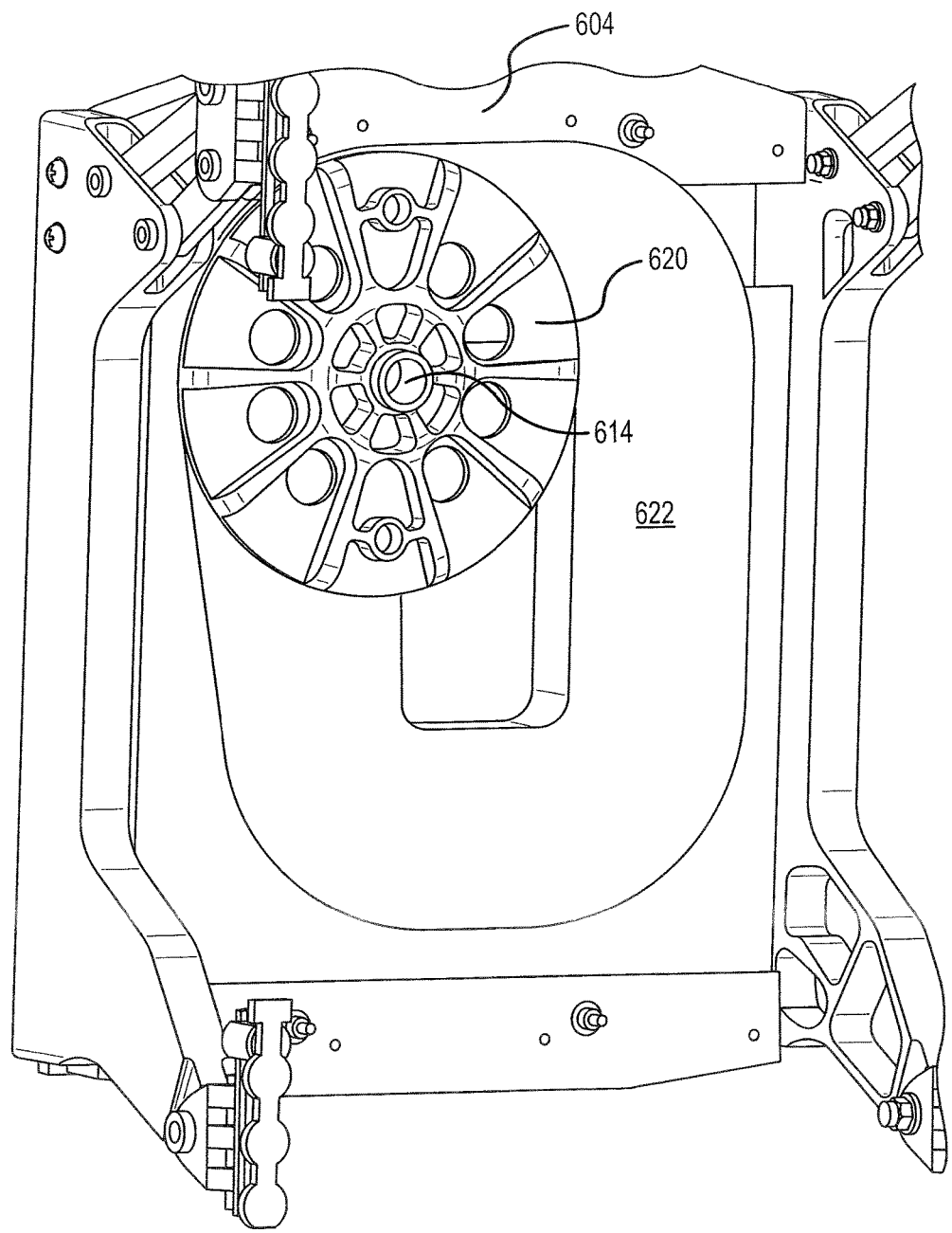
FIG. 6C illustrates a bottom up view of a cabin fixture, in accordance with various embodiments.

In various embodiments and with reference now to FIG. 5, a cross section of a brake assembly 200 is shown in the unlocked state. A motive force 500 is applied to the carriage 202 causing the carriage to translate along the x-axis via the channel 304 toward the front of the housing 216. The axle 302 of the carriage 202 follows the slot 206 as it rides from the bottom to the top of the ramp 205. As the carriage 202 rides along the ramp 205, lever 204 pivots about pin 212 and, in response to the translation of the carriage 202, is driven downward toward the unlocked state proximate the bottom of the housing 216. Shaft 208 extends downward (in the negative z direction) further beneath housing 216 in response to the movement of lever 204 from the locked to the unlocked state thereby compressing spring 308, generating spring force 502, and opening gap 504. Brake plate 220 is thereby disposed less proximate the housing 216 in the unlocked state than the locked state in response to the extension of the shaft 208.

It will be appreciated by those skilled in the art that, in various embodiments, the geometry of a ramp, such as ramp 205, and the spring constant of a spring, such as spring 308, may be configured such that a motive force, such as motive force 500, tends to vary with respect to a spring force, such as spring force 502, wherein the variation is approximately linear with respect to the translation of a carriage, such as carriage 202, along a ramp, such as ramp 205, from a locked to an unlocked state.

In various embodiments and with reference now to FIGS. 6A, 6B, 6C, and 7A, a cabin fixture 600 comprises a seat pan 602, a pedestal 604, and a brake assembly 606. Brake assembly 606 is coupled to seat pan 602 and comprises a carriage 608, a lever 610 having a ramp 612, a shaft 614, and a pivot 616. The ramp 612 may comprise a slot 613. The shaft 614 is disposed within the pedestal 604 and has a first end 618 coupled to a brake plate 620. Brake plate 620 rests below pedestal 604 proximate friction surface 622.

In various embodiments, a threaded coupling 624 provides for the adjustment of brake plate 620 along the z-axis between about 0.0005 inches (0.00127 cm) to about 0.01 inches (0.0254 cm) for every 180 degree rotation of the brake plate 620, between about 0.0015 inches (0.00381 cm) to about 0.01 inches (0.0254 cm) for every 180 degree rotation of the brake plate 620, and between about 0.005 inches (0.0127 cm) to about 0.01 (0.0254 cm) inches for every 180 degree rotation of the brake plate 620, wherein the term about in this context only refers to +/−0.0001 inches (0.000254 cm).

In various embodiments, a cabin fixture may comprise one of steel, stainless steel, aluminum, aluminum alloy, titanium, titanium alloy, composite, or a polymeric material.

Figure 7A:
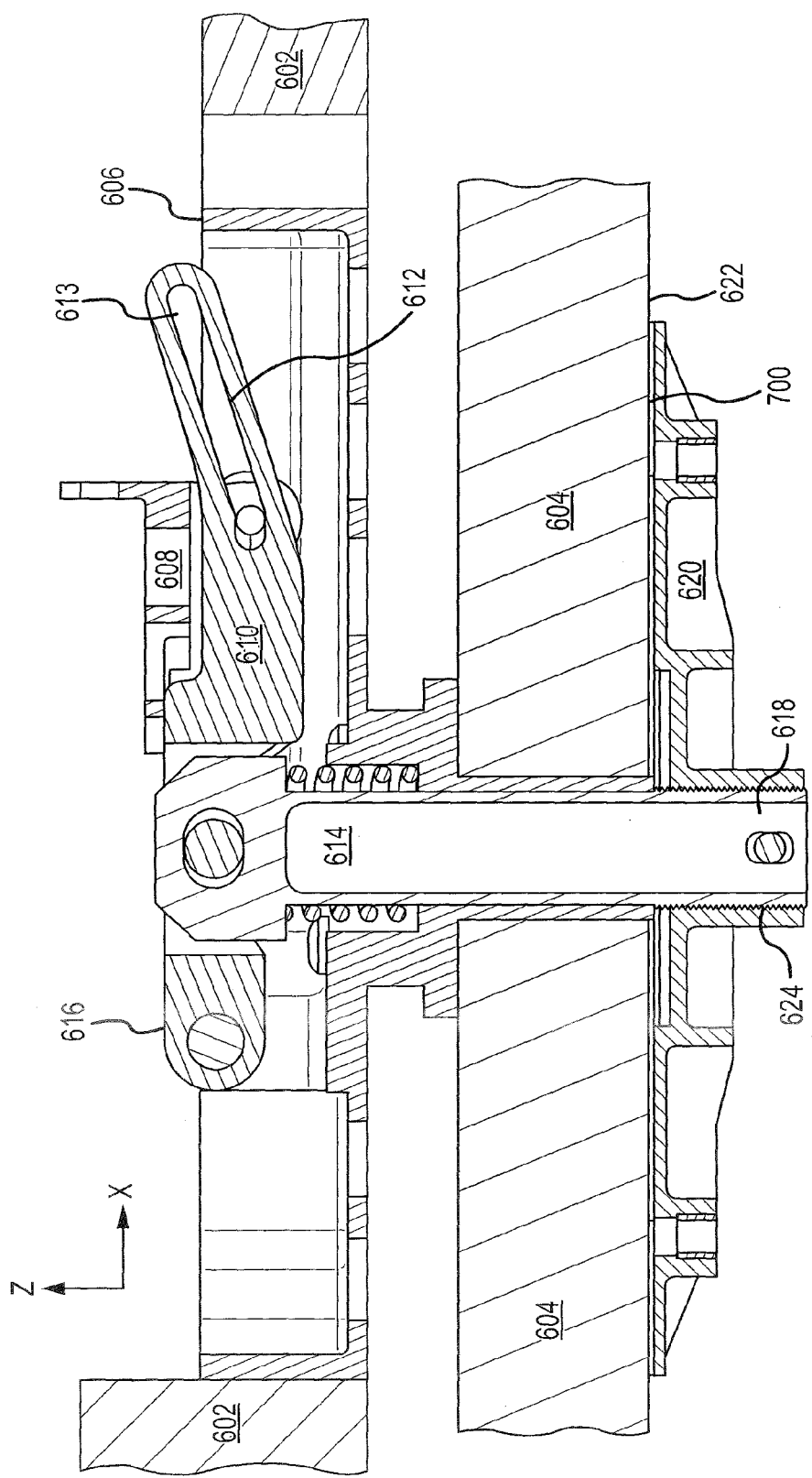
FIG. 7A illustrates a cross section of a cabin fixture in the locked state, in accordance with various embodiments.
Figure 7B:
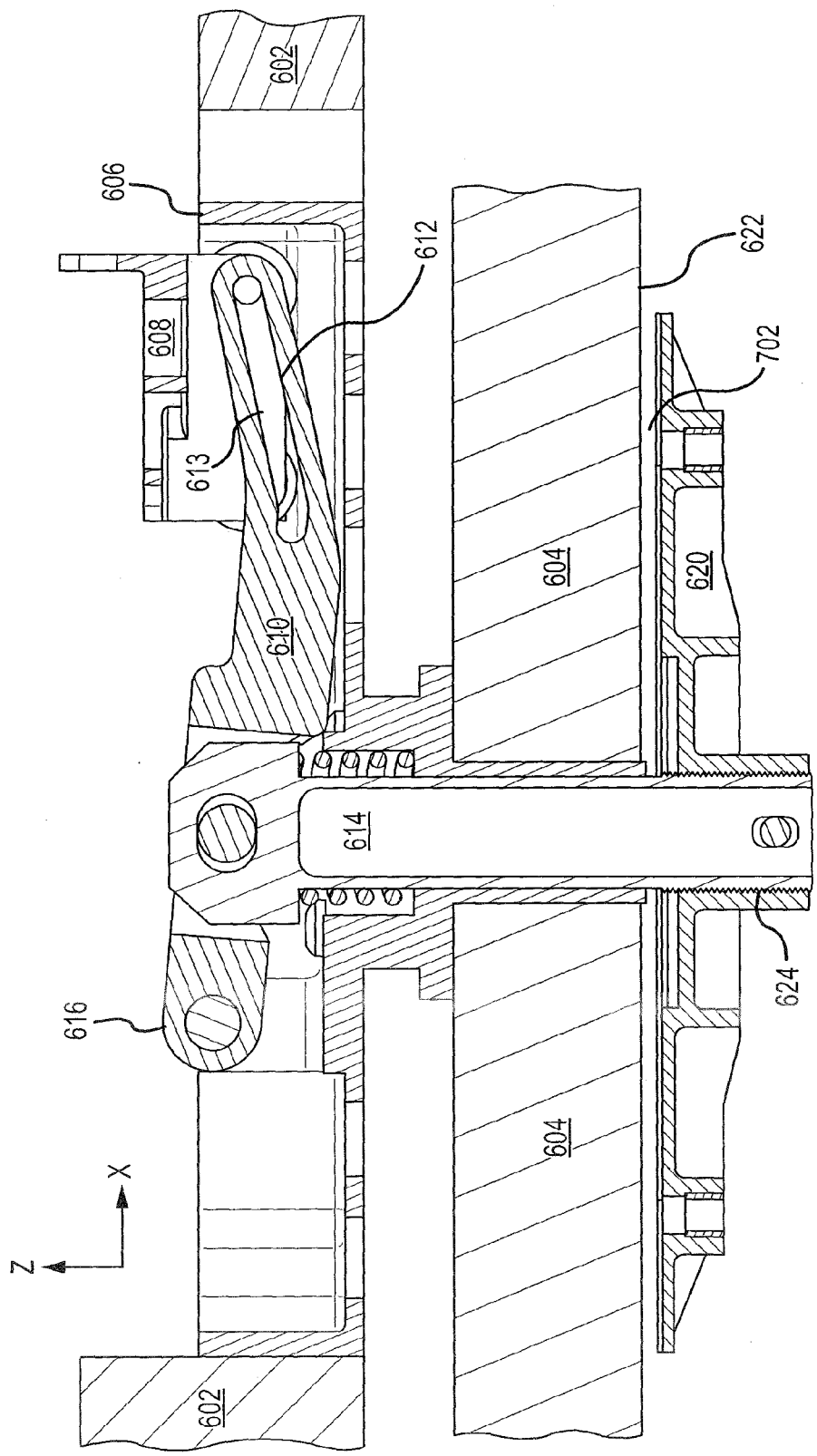
FIG. 7B illustrates a cross section of a cabin fixture in the unlocked state, in accordance with various embodiments.
Figure 8:
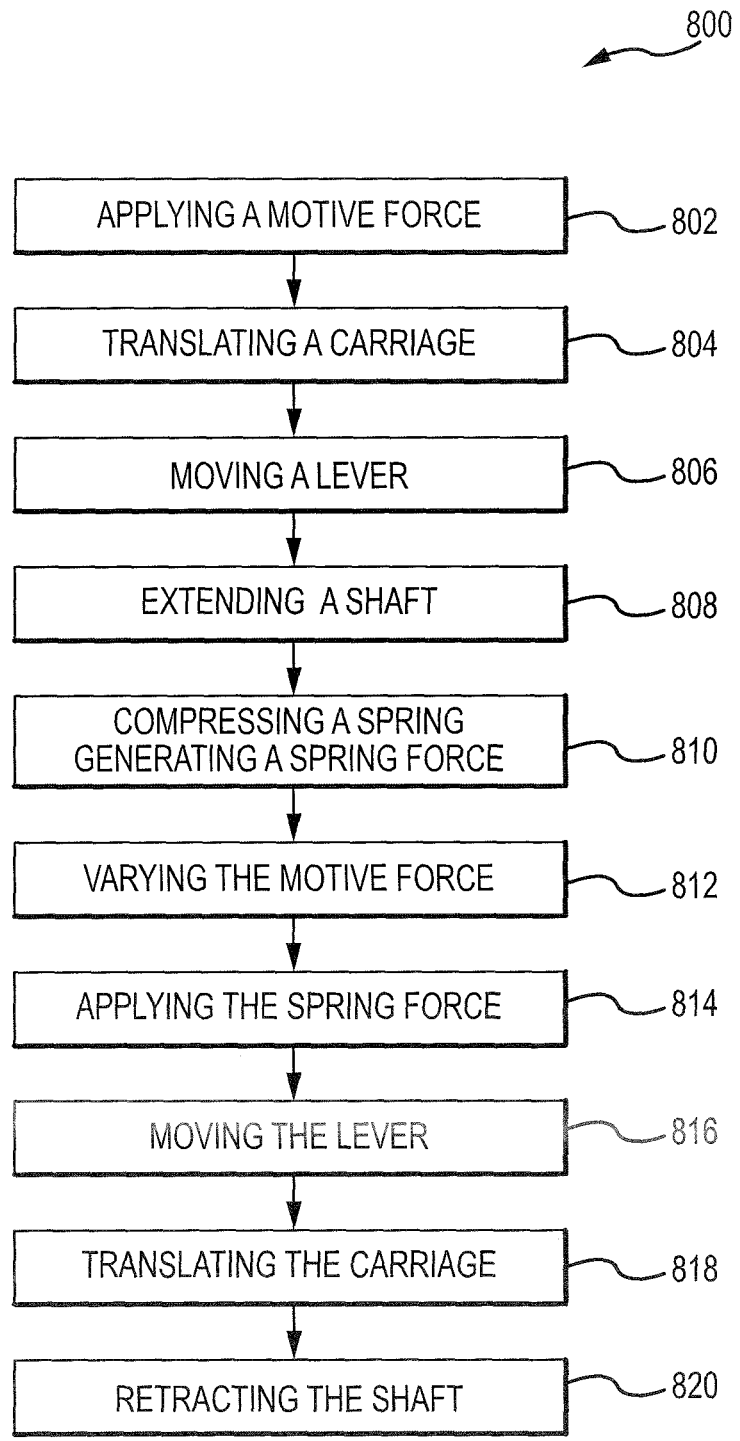
FIG. 8 illustrates a method of operation for a brake assembly, in accordance with various embodiments.

In various embodiments and with reference now to FIGS. 7A and 7B, in the locked state depicted in FIG. 7A brake plate 620 contacts fiction surface 622, generating interference 700, which tends to limit the rotation of the seat pan 602 with respect to the pedestal 604. In the unlocked state depicted in FIG. 7B, shaft 614 has extended in response to the carriage 608, translating along the ramp 612 from the locked to the unlocked state hence driving brake plate 620 away from friction surface 622 and opening gap 702, thereby disrupting interference 700 and tending to allow rotation of the seat pan 602 with respect to the pedestal 604.

In various embodiments, cabin fixture 600 may be exposed to an extreme load, such as, for example, a crash load. It will be appreciated that, in various embodiments, a brake assembly, such as brake assembly 606, may be designed such that the shaft, such as shaft 614, the lever, such as lever 610, and the carriage, such as carriage 608, tend to prevent the brake assembly from transitioning from the locked state to the unlocked state in response to an extreme load. In this respect, while in the locked state a slot, such as slot 613, may be configured to position the carriage, the lever, and the shaft such that crash loads tend to bypass other structures and tend to be transmitted directly from the brake plate to the shaft and ultimately to the seat pan.

In various embodiments and with combined reference to FIGS. 1, 4, 5, and 8 a method 800 of operating a brake assembly comprises applying a motive force 802 which may comprise pulling on a cable, such as cable 120, or applying a motive force, such as motive force 500, to a carriage, such as carriage 202. Translating a carriage 804 may comprise translating a carriage, such as carriage 202, along a ramp, such as ramp 205 from a locked state to an unlocked state in response to the motive force. Moving a lever 806 may comprise pivoting a lever, such as lever 204, downward toward the bottom of a housing, such as housing 216, from the locked state to an unlocked state in response to the translation of a carriage, such as carriage 202, along a ramp, such as ramp 20. Extending a shaft 808 may comprise extending a shaft, such as shaft 208, downward further beneath a housing, such as housing 216, in response to the movement of a lever, such as lever 204, from the locked state to an unlocked state. Compressing a spring and generating a spring force 810 may comprise compressing a spring, such as spring 308, in response to the movement of a lever, such as lever 204, downward toward the bottom of a housing, such as housing 216, from the locked state to an unlocked state while a motive force, such as motive force 500, is applied and generating a spring force, such as spring force 502. Varying the motive force 812 may comprise configuring the geometry of a ramp, such as ramp 205, and the spring constant of a spring, such as spring 308, such that a motive force, such as motive force 500, tends to vary with respect to a spring force, such as spring force 502, wherein the variation is approximately linear with respect to the translation of a carriage, such as carriage 202, along a ramp, such as ramp 205, from a locked to an unlocked state. Applying the spring force 814 may comprise removing a motive force, such as motive force 500, and applying a spring force, such as spring force 502, to a lever, such as lever 204. Moving the lever 816 may comprise pivoting a lever, such as lever 204, upward toward the top of a housing, such as housing 216, from the unlocked to the locked state in response to the application of a spring force, such as spring force 502, to a lever, such as lever 204. Translating the carriage 818 may comprise translating a carriage, such as carriage 202, along a ramp, such as ramp 205, from the unlocked to the locked state in response to the application of a spring force, such as spring force 502, to a lever, such as lever 204. Retracting the shaft 820 may comprise withdrawing a shaft, such as shaft 208, upward toward a housing, such as housing 216, in response to the translation of a carriage, such as carriage 202, along a ramp, such as ramp 205, from the unlocked state to the locked state and the movement of a lever, such as lever 204, from the unlocked to the locked state.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake assembly comprising:
   a carriage;
   a lever having a ramp, a shaft, and a pivot,
   wherein the ramp comprises a slot,
   wherein the lever is mounted to the pivot,
   wherein the shaft is coupled to the lever, and
   wherein the carriage is configured to ride along the ramp and constrained to move in a plane substantially perpendicular to the shaft.

2. The brake assembly of claim 1, further comprising a spring in communication with the lever.

3. The brake assembly of claim 1, wherein the shaft comprises a first end and a brake plate coupled at the first end.

4. The brake assembly of claim 1, further comprising an actuation lever coupled to the carriage.

5. The brake assembly of claim 4, wherein the coupling between the actuation lever and the carriage comprises a cable.

6. The brake assembly of claim 1, wherein a portion of the shaft is threaded.

7. The brake assembly of claim 1, wherein the carriage comprises a wheel.

8. The brake assembly of claim 7, wherein the wheel is disposed in a channel.

9. The brake assembly of claim 1, comprising at least one of steel, stainless steel, aluminum, aluminum alloy, titanium, titanium alloy, composite, or a polymeric material.

10. A cabin fixture comprising:
    a seat pan, a pedestal, and brake assembly,
    wherein the brake assembly comprises a carriage, a lever having a ramp, a shaft, and a pivot, wherein the lever is mounted to the pivot, wherein the shaft is coupled to the lever, wherein the carriage is configured to ride along the ramp and constrained to move in a plane substantially perpendicular to the shaft,
    wherein the seat pan is coupled to the brake assembly,
    wherein a portion of the shaft is disposed within the pedestal.

11. The cabin fixture of claim 10, further comprising a brake plate, wherein the pedestal comprises a friction surface, wherein the shaft comprises a first end, wherein the brake plate is coupled to the first end, and wherein an interference between the friction surface and the brake plate tends to limit rotation of the seat pan with respect to the pedestal.

12. The cabin fixture of claim 10, wherein the ramp comprises a slot.

13. The cabin fixture of claim 10, wherein the portion of the shaft is threaded.

14. The cabin fixture of claim 10, comprising at least one of steel, stainless steel, aluminum, aluminum alloy, titanium, titanium alloy, composite, or a polymeric material.

15. A method of operating a brake assembly comprising:
    applying a motive force to a carriage,
    translating the carriage along a ramp from a locked state to an unlocked state in response to the motive force,
    moving a lever from a locked state to an unlocked state in response to the translation of the carriage along the ramp, and
    extending a shaft in response to the movement of the lever from the locked state to the unlocked state.

16. The method of claim 15, further comprising compressing a spring and generating a spring force in response to the movement of the lever from the locked state to the unlocked state while the motive force is applied.

17. The method of claim 16, further comprising varying the motive force with respect to the spring force in response to the translation of the carriage along the ramp from the locked state to the unlocked state, wherein the variation is approximately linear with respect to the translation of the carriage.

18. The method of claim 17, further comprising removing the motive force from the carriage and applying the spring force to the lever,
- moving the lever from the from the unlocked state to the locked state in response to the application of the spring force and translating the carriage along the ramp from the unlocked state to the locked state in response to the application of the spring force.

19. The method of claim 18, further comprising retracting the shaft in response to the translation of the carriage along the ramp from the unlocked state to the locked state and the movement of the lever from the unlocked state to the locked state.

\* \* \* \* \*